United States Patent Office 3,282,973
Patented Nov. 1, 1966

3,282,973
SYNTHESIS OF CARBOXYLIC ACIDS
John Devine, Liverpool, and James Francis Davies, Rock Ferry, England, assignors to Lever Brothers Company, New York, N.Y., a corporation of Maine
No Drawing. Filed Mar. 1, 1963, Ser. No. 262,187
Claims priority, application Great Britain, Mar. 7, 1962, 8,814/62
10 Claims. (Cl. 260—413)

This invention relates to the synthesis of organic acids, and in particular to the synthesis of organic carboxylic acids from olefinic substances, carbon monoxide and water.

It has been proposed to synthesise carboxylic acids from olefins, carbon monoxide and water using various conditions of temperature and pressure, by treating the olefin with carbon monoxide in the presence of a catalyst consisting of sulphuric acid of at least 90% strength.

The present invention provides a process for the synthesis of a carboxylic acid which includes reacting together an olefinic compound and carbon monoxide in the presence of an organic sulphonic acid catalyst and treating the reaction product with water.

The organic sulphonic acid can be an aliphatic sulphonic acid, an aromatic sulphonic acid or mixtures thereof.

The aliphatic sulphonic acid preferably has 1 to 20 carbon atoms in the molecule. Examples of such acids are D-camphor-10-sulphonic acid, and the alkyl sulphonic acids such as methane sulphonic acid and those sulphonic acids which are derived from sulphonation of paraffins.

The aromatic sulphonic acid can be a benzene sulphonic acid with one or more sulphonic acid groups, for example benzene sulphonic acid and benzene meta-disulphonic acid or a naphthalene sulphonic acid with one or more sulphonic acid groups, for example naphthalene-2-sulphonic acid. The aromatic sulphonic acid can be substituted in the aromatic nucleus by nitro or halogen groups; preferably only one such substituent is present. The aromatic sulphonic acid can alternatively or additionally be substituted in the aromatic nucleus by hydroxy or alkyl groups; more than one hydroxy or alkyl group can be present. Such alkyl aryl sulphonic preferably have 20 carbon atoms or less in the alkyl group and can be alkyl benzene or alkyl naphthalene sulphonic acids. Examples of substituted aromatic sulphonic acids which can be used in processes of the present invention are metanitrobenzene sulphonic acid, phenol sulphonic acid, ortho-toluene sulphonic acid, paratoluene sulphonic acid, cumene sulphonic acid, dodecylbenzene sulphonic acid and 5-nitro-ortho-toluene sulphonic acid.

A particularly useful aliphatic sulphonic acid is methane sulphonic acid. A preferred aromatic sulphonic acid is dodecylbenzene sulphonic acid in which the dodecyl group is derived from oligomers (i.e. low multiple adducts) of the lower olefins. Such dodecyl benzene sulphonic acids are generally mixtures of isomers of indeterminate and varied structure and are differentiated by the degree of branching in the side-chain; acids with both straight and branched side-chains can be used in the process of the invention.

The organic sulphonic acid may be used alone or in combination wtih a suitable strong acid such as sulphuric acid or a phosphoric acid. When a mineral acid was used in combination with the organic sulphonic acid it was found convenient to have the molar ratio of mineral to sulphonic acid between 4:1 and 1:5 and more especially between 3:1 and 1:2.

An advantage of using methane sulphonic acid and other organic suphonic acid catalysts which melt at or near room temperature is that a major proportion of catalyst can be removed from the reaction mixture by freezing out.

Olefinic compounds suitable for use in the process of the present invention can have up to 30, particularly from 2 to 20, carbon atoms in the molecule. Such compounds, which can have more than one carbon-carbon double bond, may have other functional groups in the molecule.

Examples of suitable olefinic compounds are those of the general formula:

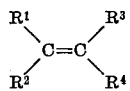

where:

$R^1$=hydrogen, an aliphatic group containing 1 to 18 carbon atoms or a phenyl group;
$R^2$=hydrogen, halogen or an aliphatic group containing 1 to 6 carbon atoms;
$R^3$=hydrogen, halogen or an aliphatic group containing 1 to 6 carbon atoms;
$R^4$=hydrogen, or an aliphatic group containing 1 to 6 carbon atoms; and, with the two central carbon atoms, $R^1$ and $R^3$ may form an alicyclic ring having 6 to 12 carbon atoms in the ring. In the description of $R^1$, $R^2$, $R^3$, and $R^4$, references to aliphatic or phenyl groups are to be understood as including substituted groups and straight, branched, unsaturated and saturated aliphatic groups.

Olefinic compounds for use in the process of the invention are preferably those in which both $R^1$ and $R^2$ are organic groups more preferably those in which $R^1$, $R^2$ and $R^3$ are organic groups and most especially those in which all of $R^1$, $R^2$, $R^3$ and $R^4$ are organic groups. Olefinic compositions in which such preferred structures are found in great abundance are mixtures of isomers and near homologues formed by oligomerisation of the lower olefins. Examples of such compositions are the tetramer of propylene (tetrapropylene) and the dimer of isobutylene (di-isobutylene).

Olefins with no other functional groups in the molecule which can be used in the process of the present invention are 1-decene, 1-dodecene, 1-hexadecene, 1-octadecene, squalene, cyclohexene, 1,5-cyclo-octadiene, 1,5,9-cyclododecatriene and limonene. Examples of olefinic compounds with other functional groups in the molecule are 1,2-dichloroethylene and cinnamyl alcohol. The olefinic compound can be produced in situ. When it is required to subject normally solid olefinic compounds to the process of the invention, it may be found convenient to supply them to the reactor or reaction zone as solutions in inert solvents such as commercial normal hexane.

In the operation of the process of the invention, the most suitable amount of catalyst will be dependent upon the nature and amount of olefin and the optimum amount of catalyst in any particular instance may be found by simple trial. Convenient mole ratios of catalyst to olefin are from 1:3 to 30:1, but it is preferred to work between 3:2 and 20:1.

The carbon monoxide may be obtained from water gas or producer gas; even water gas or producer gas themselves may be used as such.

Processes of the invention can be operated at room temperature, although a considerable variation in this factor is possible. Yields may be improved by raising the temperature, but in general temperatures above 200° C. should be avoided, lest other reactions occur, with consequent lowering of the quality and yield of the desired product. The temperature range 0° C. to 180° C., especially from room temperature to 120° C., is that within which the best results have been obtained. Particularly good results have been obtained in the range 80° C. to 100° C., but when there was concentrated sulphuric acid in the reaction mixture, temperatures below about 70° C. gave the most satisfactory results as regards freedom from by-products such as polymers, colouring matter and odoriferous constituents.

The carbon monoxide should be under pressure and a convenient range is within the range of 20 to 150 atmospheres, particularly in the range 50–125 atmospheres.

The reaction between olefin and carbon monoxide should preferably be conducted under substantially anhydrous conditions. The presence of a substantial amount of water at this stage may have a deleterious effect.

Carboxylic acids synthesised by the process of the present invention can be obtained having greater mobility, lighter colour and less offensive odour than comparable products made using concentrated sulphuric acid alone as catalyst.

It is desirable in carrying out the process of the present invention to ensure that there is good contact between the carbon monoxide and the olefin. It may be advantageous in some instances to operate processes of the invention in solution in order to reduce the viscosity of the mixture of olefinic compound and catalyst, thus facilitating agitation.

Processes of the present invention can be operated as continuous processes or as batch processes.

In the following examples, which illustrate the invention, the yields are calculated on the amount of olefin.

*Example 1*

A stainless steel autoclave fitted with an injection pump was charged with 150.4 g. (1.6 moles) of methane sulphonic acid. The autoclave was sealed, flushed out with carbon monoxide and pressurised with carbon monoxide to 100 atmospheres. The contents of the autoclave were heated to 100° C. and maintained at this temperature. Propylene tetramer was introduced into the autoclave by means of the injection pump at 0.56–1.12 ml./min. until a total of 33.6 g. (0.20 mole) of tetramer had been added. During the introduction of the tetramer the contents of the autoclave were continually agitated, and the carbon monoxide pressure varied between 92 and 100 atmospheres. When the addition of the tetramer had been completed, agitation was continued for a further 30 minutes after which 20 ml. of water were added by means of the injection pump, the autoclave being still under carbon monoxide pressure. After the autoclave had been allowed to cool the pressure was released. The reaction mixture was washed out of the autoclave with isopropanol and analysed for carboxylic acid. The analysis indicated that 27.1 g. of carboxylic acid had been formed, a yield of 64%. The carboxylic acid product obtained was quite mobile and had a light colour and an inoffensive odour.

*Example 2*

The autoclave of Example 1 was charged with 192 g. (2 moles) of methane sulphonic acid and 28 g. (0.17 mole) of propylene tetramer. The autoclave was sealed, flushed with carbon monoxide and pressurised with carbon monoxide to 60 atmospheres. The contents of the autoclave were then agitated for 90 minutes at a temperature of 27–35° C. during which time the pressure varied between 54 and 60 atmospheres, after which 20 ml. of water were added by means of the injection pump. After the contents of the autoclave had been allowed to cool, the pressure was released and the contents of the autoclave washed out and analysed. The analysis indicated that 21.6 g. of carboxylic acid had been formed, a yield of 60.3%.

*Example 3*

The autoclave of Example 1 was charged with 192 g. (2 moles) of methane sulphonic acid and 23.4 g. (0.17 mole) of 1-decene. The autoclave was sealed, flushed with carbon monoxide and pressurised with carbon monoxide to 63 atmospheres. The contents of the autoclave were agitated for 60 minutes while they were heated to 99–101° C. and then for a further 60 minutes within that temperature range. 20 ml. of water were added by means of the injection pump after which the contents of the autoclave were allowed to cool. The pressure was released and the contents of the autoclave were washed out and analysed. The analysis indicated that 9.9 g. of carboxylic acid had been formed, a yield of 32.0%.

*Example 4*

The autoclave of Example 1 was charged with 258 g. (about 1 mole) of mixed aliphatic sulphonic acids derived from paraffins. The autoclave was then sealed, flushed with carbon monoxide and pressurised with carbon monoxide to 68 atmospheres. The contents of the autoclave were then agitated while they were heated to a temperature of 100° C. and 16.8 g. (0.1 mole) of propylene tetramer was injected at 0.18–0.52 ml./min. The contents of the autoclave were agitated for a further 90 minutes at 100° C., the operating pressure during this period being 73–75 atmospheres. 20 ml. of water were added by means of the injection pump after which the contents of the autoclave were allowed to cool. The pressure was released and the contents of the autoclave were washed out and analysed. The analysis indicated that 4.2 g. of carboxylic acid had been formed, a yield of 19.6%.

*Example 5*

The autoclave of Example 1 was charged with 226 g. (1 mole) of naphthalene-2-sulphonic acid. The autoclave was sealed, flushed out with carbon monoxide and pressurised with carbon monoxide to 100 atmospheres. Propylene tetramer was injected into the autoclave by means of the injection pump at 0.30–0.65 ml./min. until a total of 56.0 g. (0.33 mole) of tetramer had been added. During the introduction of the tetramer, the contents of the autoclave were continually agitated for 60 minutes and during this time were heated to 110° C. When all the tetramer had been added, agitation was continued at this temperature for a further 30 minutes after which 20 ml. of water were injected into the autoclave which was still under carbon monoxide pressure. The contents of the autoclave were allowed to cool after which the pressure was released. The reaction mixture was washed out of the autoclave with isopropanol and analysed for carboxylic acid. The analysis indicated that 7.3 g. of carboxylic acid had been formed, a yield of 10.3%.

*Example 6*

The autoclave of Example 1 was charged with 236.2 g. (1.5 mole) of paratoluene sulphonic acid. The autoclave was sealed, flushed out with carbon monoxide and pressurised with carbon monoxide to 100 atmospheres. Propylene tetramer was injected into the autoclave at a rate of 0.4 ml./min. until a total of 16.8 g. (0.1 mole) of tetramer had been added. During the introduction of the tetramer the contents of the autoclave were agitated and heated to 110° C. When all the tetramer had been added, agitation was continued for a further 30 minutes, after which 20 ml. of water were injected into the autoclave which was still under carbon monoxide pressure. The contents of the autoclave were allowed to cool after which the pressure was released. The reaction mixture was washed out of the autoclave with isopropanol, and analysed for carboxylic acid. The analysis indicated that 11.4 g. of carboxylic acid had been formed, a yield of 52.8%.

*Example 7*

The autoclave of Example 1 was charged with 100 g. (0.5 mole) of cumene sulphonic acid, sealed, flushed out and pressurised with carbon monoxide to 74–75 atmospheres. The contents of the autoclave were then heated to a temperature of 102° C. while 16.8 g. of propylene tetramer were injected into the autoclave at 0.30–0.60 ml./min. The contents of the autoclave were agitated at this temperature for a further 90 minutes, after which 20 ml. of water were added by means of the injection pump. The contents of the autoclave were allowed to cool. The carbon monoxide pressure was then released and the contents of the autoclave washed out and analysed. The analysis indicated that 7.8 g. of carboxylic acid had been formed, a yield of 32.4%.

*Example 8*

The autoclave of Example 1 was charged with 330 g. (1.07 moles) of a predominantly straight-chain dodecylbenzene sulphonic acid and 82.5 g. (0.84 mole) of concentrated sulphuric acid. The autoclave was then sealed, flushed out with carbon monoxide and pressurised to 91–100 atmospheres. 56 g. of propylene tetramer (0.3 mole) were then injected at 0.32–0.63 ml./min. into the autoclave, the contents of which were agitated for 5 hours after which 20 ml. of water were injected into the autoclave. The pressure was then released and the contents of the autoclave washed out and analysed. The analysis indicated that 50 g. of carboxylic acid had been formed, a yield of 71%.

*Example 9*

The autoclave of Example 1 was charged with 1 mole of a predominantly straight-chain dodecylbenzene sulphonic acid. The autoclave was sealed, flushed out with carbon monoxide and pressurised with carbon monoxide to 68–76 atmospheres. The temperature of the contents of the autoclave was raised to 100° C. with continual agitation while ⅓ mole of propylene tetramer was injected at 0.8 ml./min. The contents of the autoclave were agitated at this temperature for 2 hours more and then 20 ml. of water were added by means of the injection pump. The contents of the autoclave were allowed to cool. The pressure was then released and the contents of the autoclave washed out and analysed. The analysis indicated that a yield of 38.6% of carboxylic acid had been obtained.

*Example 10*

A stainless steel autoclave fitted with an injection pump and connected to a cylinder of carbon monoxide was charged with 1.1 moles of a predominantly straight-chain dodecylbenzene sulphonic acid. The autoclave was sealed, flushed out with carbon monoxide and pressurised with carbon monoxide to a level of about 100 atmospheres. Propylene tetramer was introduced into the autoclave by means of the injection pump at a rate of 2 ml./min. until a total of 0.71 mole of tetramer had been added. During the introduction of the alkene the contents of the autoclave were continually agitated and the temperature was maintained at about 0° C. by means of an external cooling bath. Agitation and cooling were continued for a further 30 minutes after the addition of the alkene had been completed. The homogeneous liquid product of the reaction was treated with water and the resultant liquor extracted with diethyl ether.

The carboxylic acid product in the form of a mobile, straw-coloured liquid was obtained from the ethereal solution by distillation in a yield of 28%.

*Example 11*

This example illustrates the catalysis of the reaction between an alkene and carbon monoxide by a mixture of dodecylbenzene sulphonic acid and sulphuric acid, and compares this reaction with one catalysed by sulphuric acid only, which latter reaction forms no part of the invention described and claimed herein.

The autoclave of Example 1 was charged with a mixture of 0.84 mole of concentrated sulphuric acid and 1 mole of a predominantly straight-chain dodecylbenzene sulphonic acid. The autoclave was sealed, flushed out with carbon monoxide and pressurized with carbon monoxide to a level of about 100 atmospheres. Propylene tetramer was introduced at a rate of 19–38 ml./hour until a total of 0.3 mole of tetramer had been added. During the introduction of the alkene the contents of the autoclave were continually agitated. The reaction was started at room temperature and run without heating or cooling. Agitation was continued for a further 60 minutes after the addition of the alkene had been completed. The product of the reaction was treated with water (100 ml. over 30 min.) followed by acetone (100 ml.) to minimise frothing when the pressure was released, and the resultant homogeneous liquor extracted with light petroleum.

The carboxylic acid product in the form of a mobile, pale yellow liquid was obtained from the petroleum solution by distillation in a yield of 71%.

Another experiment was performed, for comparison, in which the autoclave was charged with 1 mole of concentrated sulphuric acid, the propylene tetramer introduced at a rate of 20–26 ml./hour until a total of 1 mole of tetramer had been added, the other conditions of reaction being the same.

The carboxylic acid product was obtained in the form of a black, viscous liquid in a yield of 9%.

What is claimed is:

1. In a process for the synthesis of a carboxylic acid which process includes the step of reacting an olefinic compound with carbon monoxide under conditions to produce a carboxylic acid, the improvement comprising providing for the presence in the reaction mass of an organic sulfonic acid catalyst selected from the group consisting of (a) the sulfonic acids of aliphatic hydrocarbons having from 1 to 20 carbon atoms, (b) the sulfonic acids of benzene and naphthalene, and (c) the sulfonic acids of the hydroxy and alkyl derivatives of benzene and naphthalene, the alkyl groups having from 1 to 20 carbon atoms, the mole ratio between said sulfonic acid and said olefinic compound being between about 1:3 and 30:1.

2. A process according to claim 1 wherein said catalyst is a sulfonic acid of an aliphatic hydrocarbon having from 1 to 20 carbon atoms in the molecule.

3. A process according to claim 1 wherein said catalyst is a sulfonic acid of an aromatic hydrocarbon.

4. A process according to claim 1 in which said catalyst is methane sulfonic acid.

5. A process according to claim 1 in which said catalyst is dodecyl benzene sulfonic acid.

6. A process according to claim 1 wherein said catalyst is paraffin sulfonic acid.

7. A process according to claim 1 wherein said catalyst is naphthalene-2-sulfonic acid.

8. A process according to claim 1 wherein said catalyst is toluene sulfonic acid.

9. A process according to claim 1 wherein said catalyst is cumene sulfonic acid.

10. In a process for the synthesis of a carboxylic acid wherein carbon monoxide is reacted with an aliphatic olefinic hydrocarbon having from about 2 to about 30 carbon atoms, under substantially anhydrous conditions, at a temperature between about room temperature and about 200° C., and at a pressure of up to 150 atmospheres, the improvement comprising providing for the presence in the reaction mass of a sulfonic acid of an organic compound selected from the group consisting of (a) the sulfonic acids of aliphatic hydrocarbons having from 1 to 20 carbon atoms, (b) the sulfonic acids of benzene and naphthalene, and (c) the sulfonic acids of the hydroxy and alkyl derivatives of benzene and naphthalene, said alkyl derivatives having not more than 20 carbon atoms in the alkyl group, the mole ratio of said sulfonic acid to said olefinic hydrocarbon being between about 1:3 and 30:1.

References Cited by the Examiner

UNITED STATES PATENTS 2,831,877  4/1958  Koch _____ 260—413

CHARLES B. PARKER, *Primary Examiner.*

ANTON H. SUTTO, *Assistant Examiner.*